United States Patent Office 2,822,269
Patented Feb. 4, 1958

2,822,269

ALLOYS FOR BONDING TITANIUM BASE METALS TO METALS

Roger A. Long, Bay Village, Ohio

No Drawing. Application June 22, 1953
Serial No. 363,397

6 Claims. (Cl. 75—175.5)

This invention relates to improved brazing alloys suitable for forming joints having a high tensile strength at elevated temperatures. The development of the controlled atmosphere furnace brazing process has made possible the application of the furnace brazing processes to the bonding of metals to produce joints with qualities unheard of in the original plain copper and silver alloy braze era. To cite a sample, but important and typical example, the gas turbine compressor blade of aircraft engines may operate at temperatures as high as 800° F., requiring the use of solid forgings and/or castings of nickel-chromium alloys for both the blades proper and their attaching bases. In view of the critical metals in such alloys and the advantages that are obtainable if the base and blade materials could be selected to best perform their individual functions, not only the components, but the bond itself must have the necessary tensile, shear, and stress rupture strength and creep qualities at the elevated temperatures encountered.

Great interest has been shown, for example, in the use of titanium or titanium alloys for the blade material because of the low density of these metals and their strength at elevated temperatures. Obviously, important advantages would be obtainable if the blades could be fabricated by brazing (bonding) blades of a titanium or its alloys with a mounting base formed of stainless steel or the like, and/or to titanium or titanium alloys parts formed separately by a different method. I have performed wetting and joining tests utilizing titanium and its alloys with stainless steel and steel and have found that the characteristics of the braze and interface are similar to the examples that follow.

The behavior of these metals under forging, casting, machining, and the like, presents problems even if a given piece is to be made entirely of the same material, so regardless of whether titanium is to be joined to itself or to other metals, the nature, behavior, and characteristics of titanium and its alloys present serious problems for this service, important examples of which are:

(a) Titanium is at present expensive.
(b) Titanium metal oxidizes slightly at room temperatures, the action becoming increasingly rapid as temperatures increase.
(c) Titanium oxide or dioxide resists bonding.
(d) Welding causes embrittlement, and promotes grain growth adjacent to the weld thereby rendering welding unfit for many applications.

A principal object of the invention resides in solving these problems and making possible the bonding of titanium and its alloys to other metals or alloys of different selected characteristics. I have found that this can be accomplished by a process involving assembling the parts to be joined, applying to the joint a ground powder consisting essentially of the eutectic formed of 28% nickel and 72% titanium, by weight, heating the assembly to approximately 1950° F. for a short period of time and cooling. The cooling rate is a variable and varies as the mass of the parts involved, but for a given mass, it depends not only upon the characteristics of the titanium alloy itself, but also upon the mass of the joined parts. The titanium element in the eutectic (and to some extent the nickel metal) takes into solution any surface layer of titanium oxide that may exist on the base metal, thus causing the brazing alloy to be self fluxing or, in other words, to be its own flux to a substantial degree.

Another problem presented by the treatment of titanium and its alloys results from the grain growth that occurs at temperatures at and above about 1800° F. (time dependent), causing embrittlement and other undesirable qualities attendant with coarse grained metals. Thus from the standpoint of titanium grain growth, an alloy having a melting point lower than that of the titanium-nickel eutectic is indicated, provided that other difficulties are not introduced.

In addition to the factor of grain growth, when arriving at a suitable alloy, another characteristic of the eutectic must be considered, namely the tendency of the titanium-nickel eutectic to provide a joint wherein the strength of the braze exceeds that of the interfaces of the joint (the interfaces being the zones of intersolution of base and braze metals). Although the titanium-nickel eutectic does give good joints, in addition to the possibility of grain growth at the temperatures needed for brazing, it provides also a joint with a substantial strength-hardness gradient or variation, when passing from base metal to base metal, which gradient could adversely affect the braze ductility, and fatigue characteristics of the bond.

In addition to the aforesaid object of providing means for jointing titanium to metals, another object of the invention is to minimize grain growth, reduce the braze strength-hardness gradient (make the strength-hardness factors of the base metals, interfaces as nearly equal as possible) and to attain these advantages while holding to a minimum the porosity of the brazed joint.

In addition to use of the titanium-nickel eutectic referred to, the present invention comprehends a variety of brazing alloy powders all based on the 28% nickel–72% titanium eutectic, typical examples of which will be described in detail.

THE EUTECTIC PROCESS

The use of the titanium-nickel eutectic to solve the problem resulting from titanium oxidation by producing a self-fluxing brazing powder has been explained. The eutectic could be formed by grinding into a powder the solid solution of the metals formed by mixing titanium oxide and nickel oxide or powdered metallic nickel with powdered calcium hydride in a closed reducing retort until particles of the titanium-nickel eutectic are formed. Details of a suitable process are disclosed in the patent to Alexander 2,184,769 and an application Serial No. 236,300 of February 14, 1939, referred to in said patent, said process of formation forming no part of the present invention. The alloy can also be produced by direct alloying of titanium and nickel in correct weight proportions under an atmosphere other than oxidizing and then grinding said alloy to a powder or casting it in a rod form suitable for wire processing.

The ground powder is applied about the joint of the base parts (precleaned if necessary by etching, wire brushing, etc.), and the joint is preferably a shear type joint. A liquid volatile organic binder of a plastic type cement may be used if needed to hold the powder in place. For furnace brazing the prepared assemblage is placed in a brazing furnace and raised to at least the melting temperature of the brazing powder (approximately 1750° F.–2000° F.), and the parts are held at this temperature long enough for the braze alloy and the base parts to interdissolve and form an interface. This time depends upon the size of the parts, among other factors, as is known in the brazing art. The atmosphere enveloping the parts while being heated and cooled may be a reducing atmosphere or vaccum but is preferably an inert or substantially inert atmosphere such as one formed of at least 85% helium or argon, the balance being hydrogen. The primary function of the atmosphere is to minimize the amount or quantity of titanium oxide, which oxide makes very difficult the production of sound joints. Cooling to room temperature is initiated as soon as experience shows that the brazing material has melted and alloyed to the desired amount, the problem of base metal titanium growth also dictating a minimum heating and cooling cycle. The brazed parts are coole in the inert atmosphere to a temperature sufficiently low so that objectionable oxidation will not occur upon exposure to the air. Where one of the parts comprises titanium, for example, the parts should preferably remain in the inert atmosphere until cooled to 700° F. For torch or induction brazing fluxed or special atmosphere equipment must be used.

In describing the characteristics of the joint produced by the above method as well as that produced by the brazing alloys to be described the base metals joined will be composed each of commercially pure titanium.

THE EUTECTIC JOINT—1750°–2000° F.

Dependent on titanium-nickel ratio

Titanium base hardness _____ 20–28 Rockwell C.
Braze hardness (depends on alloying degree) _____ 47 Rockwell C.
Porosity _____ Negligible to Slight.
Flow at 1950° F_____ Good.
Wettability at 1950° F_____ Good.

A joint made with the eutectic process may have a wide application and the production of the brazing powder itself is not complicated. In addition, I contemplate processes and methods that produce the aforesaid basic type joint having different properties that will be of interest in various applications.

VARIATIONS IN BRAZING POWDER COMPOSITION

The alloys to be given as examples hereafter are all various preferred variations in the eutectic alloy of 28% nickel–72% titanium hereinafter to be referred to as the "eutectic." In accordance with requirements at hand, I shall give representative examples of brazing powders that will meet such various requirements as well as brief discussions of the important desired data that will enable those skilled in this art to determine suitable brazing compositions based upon the characteristics desired.

It was stated that the melting point of the true eutectic is about 1750° F. However, to obtain the exact eutectic analysis is costly and somewhat difficult by known processes. It is therefore, often necessary to use "off" eutectic compositions in which the titanium and nickel content may vary from the true eutectic by as much as 8% per element but preferably only by 4% per element. This off analysis increases the melting point to as high as 2000° F. Since this temperature is excessive for heating titanium or titanium alloys which heating results in base metal grain growth and brittleness (a time dependent function) the following is found to be desirable. This "off eutectic" alloy, however, will be referred to as "eutectic" as also will the true eutectic inasmuch as the behavior of the two is similar. When titanium or titanium alloys are brazed, I have found that the melting point of the braze material can be lowered by adding to the eutectic alloy a metal of the copper group, namely copper or silver. Copper, however, would ordinarily be selected because of its lower cost. These metals are characterized by having a cubic crystalline structure and a tendency to form solid solutions. The effect on the eutectic flow point of adding copper is indicated as follows in Table I.

Table 1

| Eutectic | Percent Cu Addition | Liquidus and solidus Range, ° F. | Melting point of, in ° F. |
|---|---|---|---|
| 100 | 0 | | <1,900 >1,850 |
| 95 | 5 | <50 | <1,900 >1,870 |
| 90 | 10 | <50 | <1,870 >1,850 |
| 85 | 15 | <50 | <1,790 >1,760 |
| 80 | 20 | <50 | <1,760 >1,745 |
| 70 | 30 | <50 | <1,760 >1,745 |
| 60 | 40 | <50 | <1,760 >1,745 |
| 50 | 50 | <50 | 1,745±15 |
| 40 | 60 | <50 | 1,745±15 |
| 30 | 70 | <50 | 1,745±15 |

It will be note that the addition of copper has lowered the melting point of the braze and so has in effect reduced grain growth. Also it is noted that between 10% Cu and 15% Cu there is a rapid drop in flow temperature indicating the possible formation of a tertiary eutectic in this range between Ti—Ni and Cu. Copper (and silver gives similar results) also imparts strength, and soundness to the braze as well as increasing wettability of the braze alloy. I have found that more than 35% of copper gives unsatisfactory properties whereas less than 5% does not sufficiently depress the melting point over that of the eutectic.

I have found that the addition of metals like chromium, iron, manganese, and cobalt, increases the strength and other properties such as ductility, thermal transfer, etc., of the braze without seriously increasing the melting point, and in some cases tends to smooth out the strength-hardness gradient of the joint. I have also found that beryllium functions when mixed with the eutectic and copper addition to give similar results as those obtained with the series mentioned above and gives age hardening properties to the alloys. Table 2 shows the effect of other metal additions on the flow temperature of the eutectic Ti—Ni with copper.

Table 2

| Percent Eutectic | Percent Copper Addition | Percent Mn | Percent Cr | Percent Co | Flow Temp., ° F., or Melting Point, ° F. |
|---|---|---|---|---|---|
| 85 | 15 | | | | 1,760–1,790 |
| 83.3 | 14.7 | | | 2 | 1,760–1,790 |
| 81.6 | 14.4 | | | 4 | 1,790–1,820 |
| 78.2 | 13.8 | | | 8 | 1,820–1,855 |
| 72.2 | 12.8 | | | 15 | 1,870–1,900 |
| 83.3 | 14.7 | | 2 | | 1,760–1,790 |
| 81.6 | 14.4 | | 4 | | 1,760–1,790 |
| 78.2 | 13.8 | | 8 | | 1,790–1,820 |
| 72.2 | 12.8 | | 15 | | 1,820–1,855 |
| 83.3 | 14.7 | 2 | | | 1,760–1,790 |
| 81.6 | 14.4 | 4 | | | 1,760–1,790 |
| 78.2 | 13.8 | 8 | | | 1,820–1,855 |
| 72.2 | 12.8 | 15 | | | 1,855–1,870 |

These additions are beneficial as they minimize braze porosity (liquidus and solidus are close together) and are solid solution hardness for the eutectic-copper composition. Theoretically, but unproven, these additions with the nickel of the eutectic tend to keep the copper from forming a specific intermetallic compound with the titanium but allowing the formation of a solid solution alloy with a minimum of undesirable phases.

Table 3

TYPICAL ALLOY

Composition:
- Eutectic _____ 90% (67% Ti–30.4% Ni).
- Copper _____ 10%.
- Flow temperature _____ 1870° F.
- Strength: Shear strength ____ 28,200 p. s. i.
- Porosity _____ None.
- Wettability at >1870° F ____ Excellent.

This braze equalled all others in hardness, excelled in porosity (the liquidus and solidus being close together). The lack of porosity and high strength make this an excellent brazing composition.

The examples given employed commercially pure titanium as a base metal but titanium alloy metals may also be brazed. These alloys are generally formed of 92% titanium, balance chromium and manganese at present, but the trend is toward decreasing the titanium factor for cost and economic reasons. Although titanium alloys are stronger than pure titanium, 130,000–175,000 p. s. i. yield strengths as compared to 75,000 p. s. i. yield strength for pure titanium, they can be brazed under my invention by taking into consideration the desired melting point, braze strength, and braze hardness gradient and adjusting the temperature lowering and the strength increasing components accordingly. It is to be noted that the heat treating solution temperatures for these alloys are in the neighborhood of 1750° F. to 1875° F., so that the heat treating step can be combined with the brazing step, which is important from an economy aspect.

EXAMPLES OF TITANIUM BASE METALS

Examples of titanium base metals other than commercially pure titanium now being commercially offered to the trade are as follows:

1. 2.7% chromium by weight
   1.4% iron by weight
   95.9% titanium by weight
2. 4% manganese by weight
   4% aluminum by weight
   92% titanium by weight
3. 5% aluminum by weight
   5% chromium by weight
   90% titanium by weight (where the base metals are formed of alloys of which the above are examples of current materials alpha-beta phases). Beta combinations are the future in this field and involve higher alloy contents.

Another highly desirable characteristic of this brazing alloy is that the effect known in the art as "washing" can be minimized. Washing, refers to that action wherein the braze metal (which it must be remembered is largely titanium) and the base metal dissolve or alloy into one another to form a new alloy, thereby rendering somewhat inaccurate original strength and hardness estimates. I have found that the washing effect can be controlled when the titanium-nickel components forming the bulk of the braze powder are not in the 72% Ti–28% nickel combination but differ from this composition, for example, if they are combined in the ratio of 66% titanium to 34% nickel. Then by adding up to 6% of titanium metal by weight, washing can be minimized. Although an alloy of this type would have a melting point higher than that of the eutectic, the flow point can be controlled, as taught here, by adding metals like copper and silver. This alloy has the advantage that the titanium addition by alloying with the near-eutectic composition, counteracts the tendency for the near-eutectic alloy to wash or dissolve heavily the base titanium metal. However, washing can be beneficial and where increased alloying is desired, an alloy composition having slightly less titanium than the eutectic composition (up to 4–8% by weight) would alloy rapidly with the base titanium alloy. It may be advantageous under certain conditions to have an "off eutectic" alloy available.

Another advantage of utilizing the high titanium eutectic is that by dissolving the base metal titanium, you move into a region of titanium-nickel alloys where single solid solution phases are present, thus eliminating the problem of having intermetallic phases at the brazing interfaces.

Other advantages of my braze alloys are that they have a high resistance to oxidation and to chemical corrosion, while silver or copper base alloys are relatively poor in this respect.

In the claims that follow the expression "metals of the copper group" refers to copper and silver, classified in Group I of Mendeleeff's Periodic Arrangement of the Elements. The metal nickel also serves the same function as do the copper group metals, namely lowering of the braze melting point, only when the titanium content of the braze alloy is high and the addition of the proper amount of nickel would lower to the theoretical eutectic composition.

The expression "metals of the chromium series" refers to the metals iron, chromium, manganese, and cobalt, arranged in series 4 of Mendeleeff's table. The metal beryllium also serves the same function, namely to increase the strength of the joint and to make possible levelling the hardness gradient of the braze, interface and base alloy.

The term "titanium-nickel eutectic" will refer to an alloy of substantially 72% titanium and 28% nickel that may be prepared as described previously and also may vary up to 8% of either constituent in a weight percentage analysis.

Throughout this expression the terms "brazing" and "bonding" have been used synonymously. The term brazing, originally employed where brass was used as the bonding agent because of its high strength and low melting point as compared to soft solder for instance, is now commonly employed in the art with reference to newer processes wherein the common factor is the joining of base metals by a bonding (brazing) agent that has a melting point lower than that of the base metals and effects a certain surface penetration or intersolution with the faces of the base metals (the interface) to make a joint. The process will be referred to as 'bonding" in the claims.

The expression "titanium base metals" as employed in the claims refers to the composition of the base components bonded together which are composed either of pure titanium of titanium alloys of the general order of those previously described.

What is claimed is:

1. A bonding material consisting, by weight, substantially of at least 65% to 95% of a binary alloy of about 20% to 36% nickel and 64% to 80% titanium, the balance of the material being metal selected from the group consisting of copper, silver, and mixtures thereof.

2. A bonding material consisting, by weight, substantially of 65% to 92% of titanium-nickel eutectic, the balance of the material being metal selected from the group consisting of copper, silver, and mixtures thereof.

3. An alloy consisting, by weight, substantially of the following:

|  | Percent |
|---|---|
| Titanium-nickel eutectic | 65 to 95 |
| Metal selected from the group consisting of copper, silver, and mixtures thereof | 5 to 35 |
| Metal selected from the group consisting of iron, chromium, manganese, cobalt, vanadium, beryllium, and mixtures theerof | 2 to 15 |

4. A bonding material consisting, by weight, substantially of the following:

| | Percent |
|---|---|
| A powdered solid solution of titanium and nickel alloyed by weight in the proportion of 68% to 76% titanium and 32% to 24% nickel | 65 to 95 |
| Metal selected from at least one of the following groups | Balance |
| Group A which consists of silver, copper, and mixtures thereof; and | |
| Group B which consists of iron, chromium, manganese, cobalt, vanadium, beryllium and mixtures thereof. | |

5. A bonding material consisting, by weight, substantially of the following:

| | Percent |
|---|---|
| Powdered solid alloy of titanium and nickel in a proportion by weight of 72% titanium to 28% nickel | 65 to 92 |
| Powdered titanium metal | Trace to 6 |
| Metal selected from the group consisting of silver, copper, and mixtures thereof | Balance |

6. A material consisting of the following, by weight:

| | Percent |
|---|---|
| Titanium-nickel eutectic | About 80 |
| Metal selected from the group consisting of copper, silver, and mixtures thereof | About 15 |
| Metal selected from the group consisting of iron, chromium, manganese, cobalt, vanadium, beryllium, and mixtures thereof | About 5 |

References Cited in the file of this patent

UNITED STATES PATENTS

| 2,105,653 | Honda | Jan. 18, 1938 |
| 2,714,760 | Boam | Aug. 9, 1955 |

FOREIGN PATENTS

| 677,213 | Great Britain | Aug. 13, 1952 |

OTHER REFERENCES

WADC Technical Report 52–313, Part I, published November 1952.

Batelle Memorial Institute, "Brazing Titanium to Titanium and to Mild and Stainless Steels." Wright Air Development Center, pages 1–3, 16, 18, 29 and 30. Copy in Div. 3.

"Titanium," November 1949, Products Enginnering, pages 145–147.

Metals Handbook, published 1948 by American Society for Metals, Cleveland, Ohio, pages 80 and 81.

"Equilibrium Diagrams of Titanium Alloy Systems," published March 1952, Watertown Arsenal, Watertown, Mass., as information. T4, pages 47 and 48 are relied on.

Brazing Titanium to Titanium and to Mild and Stainless Steels, WADC Technical Report 52–313, part 2, pages 30–33.